United States Patent [19]

Bogash et al.

[11] 3,873,533

[45] Mar. 25, 1975

[54] 2-AMIDO-7-AMINO CEPHALOSPORANIC ACIDS AND RELATED COMPOUNDS

[75] Inventors: Richard Bogash, Philadelphia; Milton Wolf, West Chester; John H. Sellstedt, King of Prussia, all of Pa.

[73] Assignee: American Home Products Corporation, New York, N.Y.

[22] Filed: Jan. 18, 1971

[21] Appl. No.: 107,537

Related U.S. Application Data

[63] Continuation-in-part of Ser. No. 843,783, July 22, 1969, Pat. No. 3,669,980.

[52] U.S. Cl............ 260/243 C, 260/239.1, 424/271, 424/246
[51] Int. Cl....................... C07d 99/16, C07d 99/24
[58] Field of Search...................... 260/239.1, 243 C

[56] References Cited
UNITED STATES PATENTS 3,499,909   3/1970   Weissenburger................ 260/243 C
3,635,953   1/1973   Wolf et al........................ 260/239.1
3,652,546   3/1972   Cheney et al..................... 260/243 C

*Primary Examiner*—Nicholas S. Rizzo

[57] ABSTRACT

This invention concerns 2-amido-6-aminopenicillanic acids, 2-amido-6-haloimidopenicillins, 2-amido-6-alkoxyimidopenicillins, 2-amido-7-aminocephalosporanic acids, 2-amido-7-haloimidocephalosporins and 2-amido-7-alkoxyimidocephalosporins which are useful as intermediates in the preparation of synthetic penicillins and cephalosporins having potent antibiotic activity. Further, it relates to a process for the preparation of these intermediates from penicillins and cephalosporins. Still further, it concerns the preparation of 6-aminopenicillanic acid and 7-aminocephalosporanic acid by the respective hydrolysis of 2-amido-6-aminopenicillanic acids and 2-amido-7-aminocephalosporanic acids.

10 Claims, No Drawings

2-AMIDO-7-AMINO CEPHALOSPORANIC ACIDS AND RELATED COMPOUNDS

This application is a continuation-in-part of U.S. Pat. application, Ser. No. 843,783 filed July 22, 1969, now U.S. Pat. No. 3,669,980, granted June 13, 1972.

This invention relates to new and novel synthetic chemical compounds. More particularly, it concerns 2-amido-6-aminopenicillanic acids, 2-amido-7-aminocephalosporanic acids and related compounds which are useful intermediates in the ultimate preparation of synthetic penicillins and cephalosporins which have potent antibiotic activity. Further, it concerns the preparation of 6-aminopenicillanic acid which is a well-known and important intermediate in the preparation of synthetic penicillins. Still further, it relates to a chemical method of preparing the intermediates of the present invention from natural and synthetic penicillins and cephalosporins.

The new and novel intermediates within the scope of the present invention are exemplified by the following formulae:

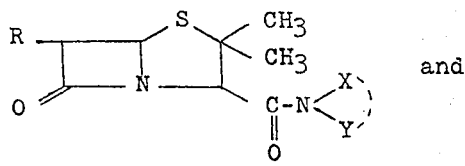 and 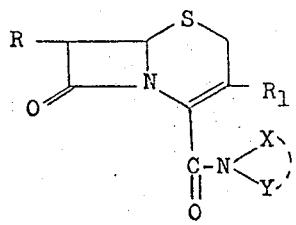

(I)                    (II)

wherein R is amino; haloimidoyl, such as, chloroimidoyl and bromoimidoyl; or iminoether; X and Y when taken separately are both electron withdrawing groups that do not have an active hydrogen atom and when taken together with the nitrogen atom to which they are attached complete a cyclic electron withdrawing group that does not have an active hydrogen atom; and the acid-addition salts thereof.

As is well-known to those skilled in the art, included in those groups that are defined as "haloimidoyl" are those haloimido substituents which are derived from natural and synthetic penicillins and cephalosporins, for example, R as employed in the penicillin formula (I) may be defined as 2-allylmercapto-1-haloethylideneamino, 1-halo-2-(γ-chlorocrotylmercapto)ethylideneamino, 1-halo-2-phenoxyethylideneamino, α-halophenethylideneamino, 1-halo-3-hexenylideneamino, 1-halohexylideneamino, 1-halo-octylideneamino and α-chloro-p-hydroxyphenethylideneamino and R as employed in the cephalosporin formula (II) may be 1-halo-2-(2-thienyl)ethylideneamino. As will also be known to those skilled in the art, included in those groups that are defined as "iminoether" are those lower alkoxyimido substituents which are derived from natural and synthetic penicillins and cephalosporins. Examples thereof, when R is employed in the penicillin formula I are: 1-(lower)alkoxy-2-allylmercaptoethylideneamino, 1-(lower)alkoxy-2-(γ-chlorocrotylmercapto)ethylideneamino, 1-(lower)alkoxy-2-phenoxyethylideneamino, α-(lower)alkoxyphenethylideneamino, 1-(lower)alkoxy-3-hexenylideneamino. 1-(lower)alkoxyhexylideneamino, 1-(lower)alkoxyoctylideneamino and α-(lower)-alkoxy-p-hydroxyphenethylideneamino and R as employed in the cephalosporin formula (II) may be 1-(lower)alkoxy-2-(2-thienyl)ethylideneamino; $R^1$ is selected from the group consisting of methyl, hydroxymethyl and (lower)alkanoyloxymethyl.

As known to those skilled in the chemical art, included in those groups which are electron withdrawing that do not have an active hydrogen atom when X and Y are taken separately are, for example: cyano; nitro; trifluoromethylsulfonyl; 2,4,6-trimethylbenzoyl; 2,3,5,6-tetramethylbenzoyl; carb(lower)alkoxy; di(lower)alkylcarbamyl; lower alkylsulfonyl; di(lower)alkylsulfamyl; di(lower)alkylamino(lower)alkylsulfonyl; lower alkanoyl e.g. tert.-butyryl; cyclo(lower)alkanoyl, aroyl e.g. naphthoyl and furoyl; substituted aroyl; arylsulfonyl e.g. naphthylsulfonyl, pyridylsulfonyl, furylsulfonyl; substituted arylsulfonyl;

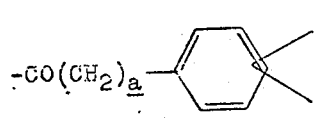, and 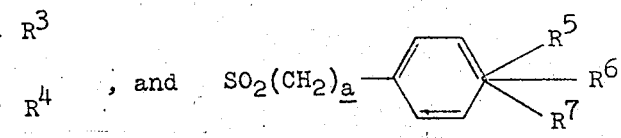

wherein $R^3$ and $R^4$ are, for example, hydrogen, lower alkyl, halogen, trifluoromethyl, lower alkoxy, phenyl, phenoxy, nitro, lower alkylsulfonyl, di(lower)alkylsulfamyl; $R^5$, $R^6$ and $R^7$ can be hydrogen, nitro, halogen, trifluoromethyl, lower alkoxy, lower alkylsulfonyl, lower alkylthio, di(lower)alkylsulfamyl, di(lower)alkylcarbamyl, cyano and carb(lower)alkoxy; and the integer $a$ is from 0 to about 6.

As is also known to those skilled in the chemical art, included in those cyclic electron withdrawing groups that do not have an active hydrogen atom when X and Y are taken together are, for example:

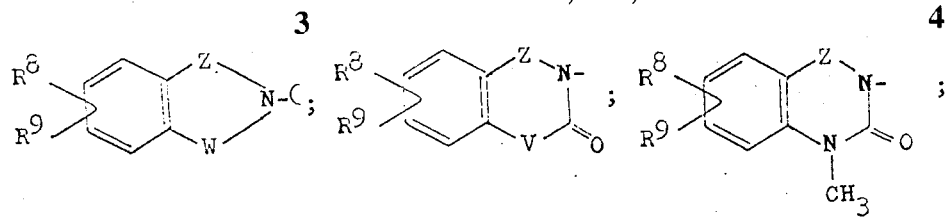

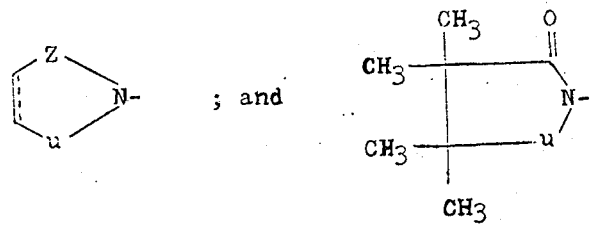

wherein $R^8$ and $R^9$ when taken separately can be hydrogen; lower alkyl; lower alkoxy; halogen; phenyl;phen(-lower)alkyl; lower alkoxyphenyl; aryl, e.g. 2-pyridyl, 4-pyridyl; trihalomethyl; nitro; di(lower)alkylamino; sulfamido, carb(lower)alkoxy, cyano, lower alkylthio, lower alkylsulfonyl, and when $R^8$ and $R^9$ are joined, they complete a benzene ring fused to the existing benzene ring to form therewith a naphthalene ring; Z is selected from the group consisting of sulfonyl and carbonyl; W is selected from the group consisting of sulfonyl, carbonyl and methylene; V is selected from the group consisting of oxygen, sulfur and methylene; $u$ is selected from the group consisting of carbonyl and methylene; and the broken line indicates the presence of a single or double bond between these two positions.

The preferred embodiments of the compounds of this invention are those of formula (III) wherein X and Y are concatenated to form a saccharyl or substituted saccharyl group. These compounds are exemplified by the following formula:

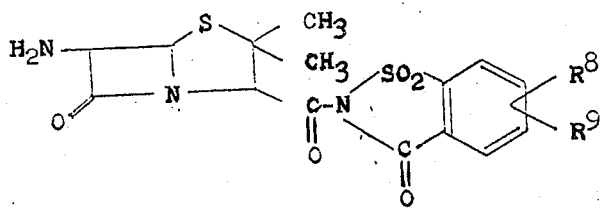

(III)

and the acid-addition salts thereof; wherein $R^8$ and $R^9$ are defined as above.

The term "lower alkyl" as employed herein, alone or in conjunction with other designated groups, is intended to encompass straight chain or branched chain alkyl groups consisting of from one to about six carbon atoms, e.g. methyl, ethyl, propyl, isopropyl, butyl, isobutyl, pentyl 2-ethylpropyl, hexyl, 2-propyl-propyl, and the like. Similarly, the terms "lower alkoxy" and "lower alkanoyl" as used herein, alone or in conjunction with other designated groups, is intended to encompass straight chain or branched chain alkoxy groups also consisting of from one to about six carbon atoms. The term "halogen" as conventionally used herein, alone or attached to other designated groups, is intended to encompass: chlorine, bromine, iodine and fluorine. As will also be understood, the ringed substituents, whether carbocylic, e.g. phenyl, benzyl, etc. or heterocyclic, e.g. 2-pyridyl, 4-pyridyl, and the like may also be substituted by one or more of such usual substituents as those set forth for $R^8$ and $R^9$ above. Similarly, the naphthalene ring resulting when $R^8$ and $R^9$ are joined as referred to above, may also carry one or more of the same substituents also referred to above. By the phrase "electron withdrawing group" is meant an electrophilic group which will inductively withdraw electrons from the carbonyl position of the 2-amido groups of the compounds of this invention thereby making these groups more liable to cleavage by a nucleophilic agent, for example, water, alkali metal hydroxides, tertiary amines, quinoline and the like, to afford a carboxylic acid group.

By the phrase "groups that do not have an active hydrogen" is meant those groups which show the absence of reactive hydrogen in the Zerevitinov determination.

The first new and novel process of the present invention concerns the synthesis of the 2-amido amine compounds of the present invention, in particular, the 2-amido-6-aminopenicillanic acids (IV) and 2-amido-7-aminocephalosporanic acids (V), which are depicted by the following formulae:

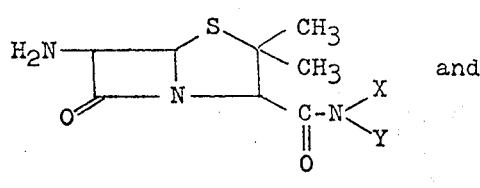 and 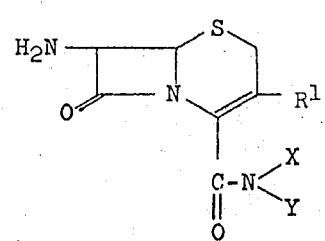

(IV) (V)

wherein R¹ is the same as hereinabove described; X and Y when taken separately are both electron withdrawing groups that do not have an active hydrogen atom and when taken together with the nitrogen atom to which they are attached complete a cyclic electron withdrawing group that does not have an active hydrogen atom; which comprises: contacting a phosphorus pentahalide, such as, phosphorus pentachloride and phosphorus pentabromide, with a diamide compound, in particular, a 2-amido derivative of a natural or synthetic penicillin (VI) or cephalosporin (VII), selected from those having the formulae:

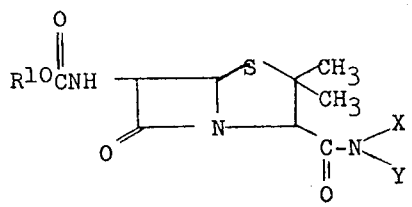

(VI)

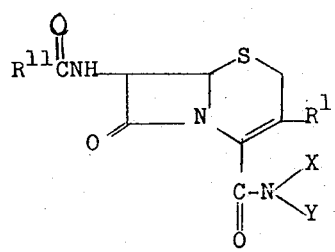

(VII)

wherein R¹ is the same as hereinabove defined; X and Y are defined as above; R¹⁰ is a substituent selected from those contained in natural and synthetic penicillins, for example, allylmercaptomethyl, γ-chlorocrotylmercaptomethyl, phenoxymethyl, benzyl, 2-pentyl, amyl, heptyl, and p-hydroxybenzyl; and R¹¹ is a substitutent selected from those contained in natural and synthetic cephalosporins e.g. 2-thienylmethyl; in a reaction-inert, aprotic solvent, in the presence of a base to afford a 2-amido haloimido compound selected from those having the formulae:

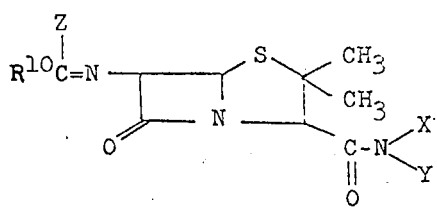

(VIII)

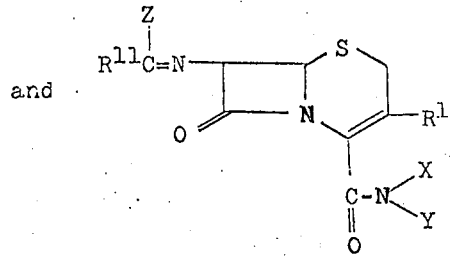

(IX)

wherein R¹, R¹⁰, R¹¹, X and Y are defined as above and Z is a halogen, e.g. chloro and bromo. The new and novel 2-amido haloimido compounds of this invention, in particular, the 2-amido-6-haloimidopenicillins (VIII) are 2-amido-6-halo imidocephalosporins (IX) prepared by the above reaction may be separated by conventional recovery procedures, e.g. the reaction mixture is filtered and the collected solid is dried to afford the product (VIII or IX). Alternatively, the unseparated product is employed directly in the following reaction.

The above prepared 2-amino haloimido compound (VIII or IX) is contacted with an alkanol to afford the corresponding 2-amido alkoxyimido hydrohalide compound, e.g. the hydrochloride or the hydrobromide selected from those having the formulae:

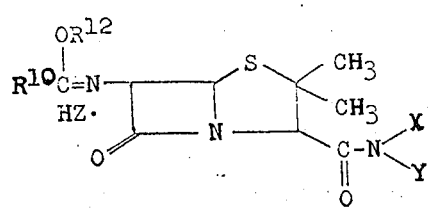

(X)

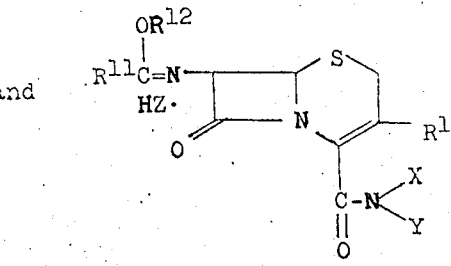

(XI)

wherein R¹, R¹⁰, R¹¹, X, Y and Z are defined as above; and R¹² is lower alkyl. The new and novel 2-amido alkoxyimido hydrohalide compounds of this invention, in particular, the 2-amido-6-alkylimidopenicillin hydrohalides (X) and the 2-amido-7-alkoxyimidocephalosporin hydrohalides (XI), prepared by the above-described substitution reaction may be employed directly in the subsequent reaction or may be recovered by standard separation procedures, e.g. filtration and drying the collected precipitate.

The 2-amido alkoxyimido hydrohalide compound (X or XI) as prepared above, is then hydrolyzed by routine procedures, e.g. contact with water to afford the corresponding hydrohalide of the 2-amido amine compound.

This hydrohalide, e.g. the hydrochloride or hydrobromide is then readily converted to its corresponding basic form (IV or V) by neutralization processes which are well-known to those skilled in the art of chemistry. For example, the hydrohalide is treated for a short time with water containing a base, such as, triethylamine, sodium bicarbonate or the like, preferably in the presence of a water-miscible solvent.

As employed herein the term "natural penicillins" includes those which are produced by fermentation as well as those that are biosynthetically prepared by the addition of certain precursors to the fermentation broth. Examples of these types of penicillins are: Penicillin O, which is designated by the 2-carboxy derivative of the compound of formula (VI) where $R^{10}$ is allylmercaptomethyl; Penicillin S, wherein $R^{10}$ is γ-chlorocrotylmercaptomethyl; Penicillin V, wherein $R^{10}$ is phenoxymethyl; Penicillin G, wherein $R^{10}$ is benzyl; Penicillin F, wherein $R^{10}$ is 2-pentenyl; Dihydropenicillin F, wherein $R^{10}$ is amyl; Penicillin K, wherein $R^{10}$ is heptyl; and Penicillin X, wherein $R^{10}$ is p-hydroxybenzyl. The term "synthetic penicillins" is used to include any penicillin which may be prepared by the acylation of 6-aminopenicillanic acid. Examples of these types of penicillins are: Ampicillin, which is designated by the 2-carboxy derivative of the compound of formula (VI), wherein $R^{10}$ is a α-aminobenzyl; Nafcillin, wherein $R^{10}$ is 2-ethoxynaphthyl and Dicloxacillin, wherein $R^{10}$ is 3-(2,6-dichlorophenyl)- 5-methyl-4-isoxazole. It should be noted that although it is most desirable to use "natural penicillins" as starting materials in the process of this invention, the process is not limited in operability to these starting materials and will operate equally well utilizing "synthetic penicillins" as reactants. By the term "cephalosporins" is meant known derivatives of cephalosporanic acid, such as, cephalothin wherein $R^{11}$ in formula (IV) is 2-thienylmethyl, as well as, those compounds wherein the 3-position "acetoxymethyl" group has been modified by known chemical procedures to afford the corresponding compounds which are substituted at the 3-position with other substituents, for example, a methyl, hydroxymethyl or other alkanoylmethyl groups. The expression "reaction-inert, aprotic solvent" encompasses those liquids which do not yield protons and will dissolve the reactants without interfering with their interaction, such as, methylene chloride, chloroform, dioxane, tetrahydrofuran, ether, dimethoxyethane, benzene, xylene and toluene. The term "base" is meant to include both organic and inorganic proton acceptors which are capable of taking up protons, e.g. quinoline, dimethylamine, dimethylaniline, pyridine, N-ethylmorpholine and potassium carbonate. Since many of the compounds (I and II) of the present invention are basic, advantage may be taken of the water solubility of salts of these compounds formed with acids in the isolation and purification of the above compounds and in the preparation of aqueous solutions thereof. Such acids are well-known in the art, for example, hydrochloric, hydrobromic, sulfuric, nitric, phosphoric, benzenesulfonic, toluenesulfonic, methylsulfonic, ethylsulfonic acids and the like. These salts may be prepared by procedures commonly employed in the art, for example, reacting the compound with an equivalent of the selected acid in aqueous solution and concentration of the solution. Other known procedures may also be employed.

The second new and novel process of the present invention concerns the preparation of 6-aminopenicillanic acid (XII) and 7-aminocephalosporanic acid (XIII) having the following 2-carboxy amine compound formulae:

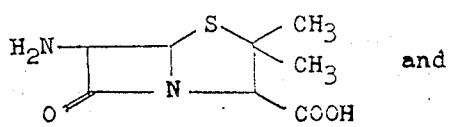 and 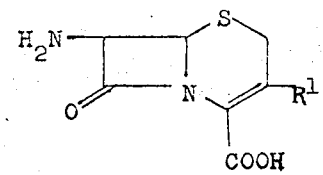

(XII) (XIII)

which comprises contacting a 2-amido amine compound (IV or V) of the formulae:

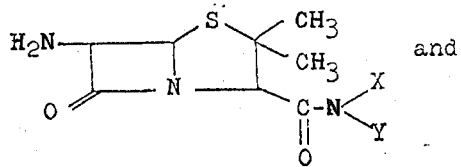 and 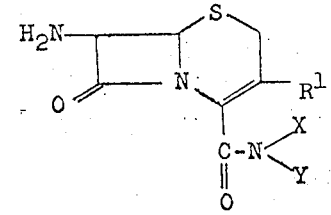

(IV) (V)

where $R^1$ is selected from the group consisting of methyl, hydrodymethyl and (lower)alkanoyloxymethyl; X and Y when taken separately are both electron withdrawing groups that do not have an active hydrogen atom and when taken together with the nitrogen atom to which they are attached complete a cyclic electron withdrawing group that does not have an active hydrogen atom; with water, in the presence of a hydrolytic catalyst, until the hydrolysis is complete. As used herein the term "hydrolytic catalyst" refers to substances which will assist in the hydrolysis of the 2-amido moiety of the 2-amido amine compounds of this invention. Many such substances will readily suggest themselves to those skilled in the art of chemistry, for example, quinoline, pyridine, imidazole and alkali metal acetates, such as, sodium acetate.

The preferred process of the present invention concerns the preparation of the above designated 2-saccharimido amine compounds, such as, 2-saccharimido-6-amino-penicillanic acids (III). These compounds (III) are synthesized by first preparing the saccharimide of a natural or synthetic penicillin, e.g. benzyl penicillin, phenoxymethyl penicillin and the like. This is accomplished by contacting a starting penicillin or the alkali metal salt thereof with a selected saccharin halide derivative, in a suitable organic solvent, e.g. methylene chloride. This reaction is conducted in the presence of an acid acceptor, such as, triethylamine when the starting penicillin employed is its acid form. When the mixture is complete the resulting solution is washed, dried, and concentrated to dryness. The residue is 2-saccharimido amide compound in particular, a 2-saccharimido-penicillin, which may then be crystallized from a suitable organic solvent system, e.g. ether in benzene.

The above prepared 2-saccharimido amide compound is dissolved in a reaction-inert, aprotic solvent, e.g. methylene chloride, in the presence of a base, e.g. quinoline and then admixed with phosphorus pentachloride to afford the corresponding 2-saccharimido chloroimido compounds, e.g. 2-saccharimido-6-chloroimidopenicillin, which is then reacted with an alkanol, e.g. methyl alcohol, ethyl alcohol, propyl alcohol, butyl alcohol and the like, so that, the chlorine atom of the imido chloride moiety is replaced by the alkoxy group supplied by the alkanol employed to afford an appropriate hydrochloride salt of a 2-saccharimido alkoxyimido compound, e.g. 2-saccharimido-6-alkoxyimidopenicillin hydrochloride.

Thereafter, water is added to the reaction mixture to hydrolyze the above-described salt, so that, there is obtained a hydrochloride of a 2-saccharimido amine compound, such as, the hydrochloride of 2-saccharimido-6-aminopenicillanic acid which may then be converted to its corresponding base by treatment with an aqueous base, e.g. triethylamine, sodium bicarbonate and the like, preferably in the presence of a water-miscible solvent.

The above prepared 2-saccharimido amine compound, is then readily converted to the corresponding 2-carboxy amine compound by contact with water in the presence of a hydrolytic catalyst. For example, 2-saccharimido-6-aminopenicillanic acid is treated at a pH of from about 1.5 to about 9, in water or a mixture of water and a water-miscible solvent until hydrolysis is complete to afford 6-aminopenicillanic acid.

The preferred method of the present invention to prepare the 2-saccharimido-6-aminopenicillanic acids (III) and 6-aminopenicillanic acid (XII) which has hereinbefore been described may be represented by the following reaction scheme:

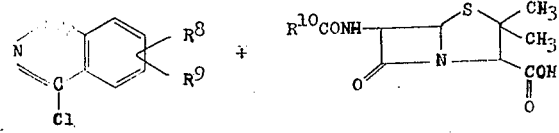

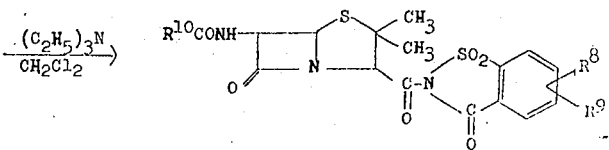

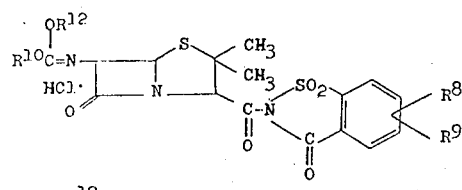

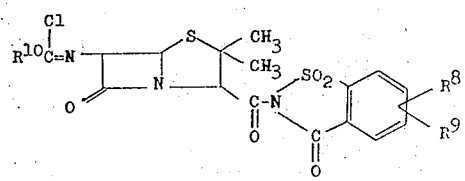

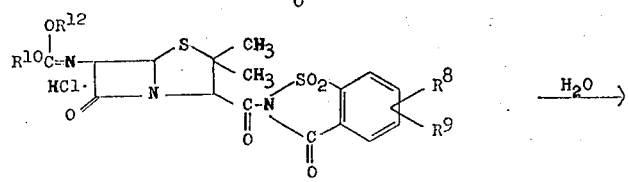

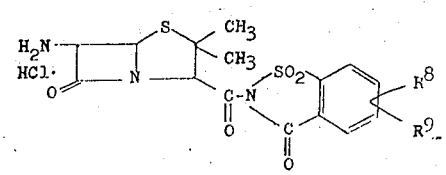

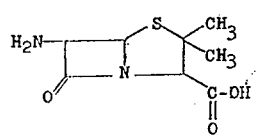

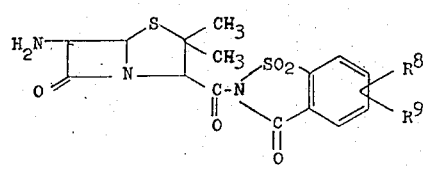

The starting diamide compounds, e.g. 2-amidopenicillins and 2-amidocephalosporins are prepared by standard procedures, e.g. reacting imidoyl halides with natural or synthetic penicillins and cephalosporins. Thus, for example, the starting 2-saccharimido penicillins for the preparation of the preferred compounds (III) of this invention are synthesized by reacting a penicillin with a 3-halosaccharin derivative, e.g. 3-chloro-1,2-benzisothiazole-1,1-dioxide or an appropriately substituted derivative thereof in an organic solvent, such as, anhydrous methylene chloride which contains an acid acceptor, e.g. triethylamine. When the condensation reaction is complete, the 2-saccharimidopenicillin may be recovered by standard procedures, for example, the reaction mixture is washed, dried, concentrated and the residue crystallized from a suitable organic solvent, e.g. 25% ether in benzene. The natural or synthetic penicillins and cephalosporins employed in the synthesis of the above-described starting materials are commercially available or are readily prepared by well-known procedures. Similarly, the imidoyl halides are commercially available or, in those instances where they are not available, they may be synthesized readily by standard organic procedures described in the chemical literature and known to those skilled in the art.

The new and novel compounds (I and II) and their acid-addition salts of the present invention, which include: 2-amido-6-aminopenicillanic acids, 2-amido-6-haloimidopenicillins, 2-amido-6-alkoxyimidopenicillins, 2-amido-7-aminocephalosporanic acid, 2-amido-7-haloimidocephalosporins and 2-amido-7-alkoxyimidocephalosporins; are extremely useful intermediates in the preparation of 6-aminopenicillanic acid and 7-aminocephalosporanic acid which by procedures which are now conventional in the art may be acylated to prepare synthetic penicillins and cephalosporins. In this regard, for example, 6-aminopenicillanic acid may be acylated with an acid chloride by the procedures described in U.S. Pat. No. 3,248,386 to afford 2-ethoxy naphthyl penicillin, or an N-carboxy anhydride as described in U.S. Pat. No. 3,206,455 to obtain D(-)-α-aminobenzylpenicillin. Both of these penicillins have potent antibiotic activity in warm-blooded animals. Employing these same procedures many synthetic penicillins and cephalosporins are prepared which possess valuable activity against both gram-positive and gram-negative bacteria.

The new and novel compounds of this invention (I and II) are also useful in preparing new synthetic 2-amidopenicillins and 2-amidocephalosporins using conventional acylation procedures. For example, a 2-amido-6-amino-penicillanic acids may be reacted with an acid chloride to obtain the 2-amido derivatives of 2-ethoxy naphthyl penicillin, or an N-carboxy anhydride to obtain the 2-amido derivatives of D(-)-α-aminobenzylpenicillin both having potent and sustained antibiotic activity in warm-blooded animals. Emoloying these same procedures synthetic 2-amido penicillins and cephalosporins are obtained which possess valuable sustained activity against both gram-positive and gram-negative bacteria.

In particular, the synthetic penicillins, cephalosporins, 2-amidopenicillins and 2-amidocephalosporins prepared from the intermediates of the present invention may be utilized in pharmacological compositions in association with pharmacologically acceptable carrier, e.g. in suitable injectable forms, including solutions and suspensions; or orally as tablets, capsules, and the like, utilizing conventional solvents, suspensoids, excipients, and the like. As previously indicated, when the compounds of this invention are employed, they may be administered orally or parenterally. Naturally, the dosage of these compounds will vary somewhat with the form of administration and the particular compound chosen. Further, it will vary with the particular subject under treatment. In general, the compounds of this invention are most desirably administered at dosage levels corresponding to those commercially available penicillins and cephalosporins. Although variations from these dosages will occur, these dosages will generally afford effective results without causing any harmful or deleterious side effects.

The following examples are given by way of illustrating some embodiments of this invention.

EXAMPLE I

2-[(3,3-Dimethyl-7-oxo-6-[2-phenoxyacetamido]-4-thia-1-azabicyclo[3.2.0]hept-2-yl)carbonyl]-1,2-benzisothiazol-3-(2H)-one 1,1-dioxide, also described as the saccharimide of phenoxymethyl penicillin, (10.3 g., 0.02 mole) is dissolved in anhydrous methylene chloride (75 ml.) and N,N-dimethylaniline (8.5 g., 0.07 mole) is added. The solution is cooled to −40°C. by an acetone-dry ice bath, and phosphorus pentachloride (4.54 g., 0.218 mole) is added over a few minutes under nitrogen. The solution is kept at −35° to −40°C. for three hours with mechanical stirring. After approximately one-half to one hour at this temperature, a white crystalline material forms which is 2-[(6-[1-chloro-2-phenoxyethylideneamino]-3,3-dimethyl-7-oxo-4-thia-1-azabicyclo[3.2.0]hept-2-yl)carbonyl]-1,2-benzisothiazol-3(2H)-one 1,1-dioxide, also known as the saccharimide of 6-chloroimidophenoxymethyl penicillin. Then 1-butanol (75 ml.) is added over approximately five minutes at −35° to −40°C. and this temperature is maintained for three hours to afford the hydrochloride of 2-[(6-[1-butoxy-2-phenoxyethylideneamino]-3,3-dimethyl-7-oxo-4-thia-1-azabicyclo[3.2.0]hept-2-yl)carbonyl]-1,2-benzisothiazol-3(2H)-one 1,1-dioxide, also named as the saccharimide of 6-butoxyimidophenoxymethyl penicillin hydrochloride. Then water (40 ml.) is added to the rapidly stirred mixture allowing the temperature to rise to 0°–5°C. The mixture is then stirred at 0°–5°C. for one hour and kept at 0°C. overnight, without stirring. The mixture is filtered and the solid is washed with anhydrous ether giving a white solid which is the hydrochloride of 2-[(6-amino-3,3-dimethyl-7-oxo-4-thia-1-azabicyclo[3.2.0]hept-2-yl)carbonyl]-1,2-benzisothiazol-3(2H)-one 1,1-dioxide, also described as the saccharimide of 6-aminopenicillanic acid, hydrochloride (2.5 g., 29%), m.p. 172°C. dec. (uncorr.).

Analysis: Calcd for $C_{15}H_{15}N_3O_5S_2 \cdot HCl \cdot 1/2H_2O$: C, 42.20; H, 4.01; N, 9.84; S, 15.02; $H_2O$, 2.10. Found: C, 42.57; H, 3.99; N, 9.14; S, 13.40; $H_2O$, 1.99.

EXAMPLE II

2-[(6-Amino-3,3-dimethyl-7-oxo-4-thia-1-azabicyclo[3.2.0]hept-2-yl)carbonyl]-1,2-benzisothiazol-3(2H)-one 1,1-dioxide hydrochloride, also described as the saccharimide of 6-aminopenicillanic acid hydrochloride (7.64 g., 0.02 mole) is dissolved in tetrahydrofuran (60 ml.) and a solution of sodium bicarbonate (3.36 g., 0.04 mole) in water (40 ml.) is added all at once. The mixture is stirred for three and a half hours at room temperature giving a solution. Then the tetrahydrofuran is stripped off at 30°C. under vacuum, and the resulting mixture is washed with methylene chloride. The aqueous fraction is then placed on a rotary evaporator at 30°C. and the methylene chloride is removed. The solution is filtered and the pH adjusted to 3.8 with glacial acetic acid. The mixture is stirred in ice-water for twenty minutes and then filtered, giving white crystals for 6-amino-3,3-dimethyl-7-oxo-4-thia-1-azabicyclo[3.2.0]heptane-2-carboxylic acid, also known as 6-aminopenicillanic acid.

EXAMPLE III 3,3-Dimethyl-7-oxo-6-(2-phenoxyacetamido)-4-thia-1-azabicyclo[3.2.0]heptane-2-carboxylic acid, also described as phenoxymethyl penicillin, (15.1 g., 0.043 mole) is added to anhydrous methylene chloride (150 ml.) contained in a dry 500 ml. three neck round bottom flask equipped with a stirrer, a drying tube and a thermometer through a U-tube nitrogen inlet. Then triethylamine (4.34 g., 0.043 mole) is added, and the solution is cooled to 5°C. in ice. Pseudosaccharin chloride (8.7 g., 0.043 mole) is added all at once, giving a canary yellow solution. The solution is stirred for one-half hour at 5°C., and kept at room temperature overnight. The solution is then brought to the boiling point for five minutes, and allowed to cool to room temperature to afford 2-[(3,3-dimethyl-7-oxo-6-[2-phenoxyacetamido]-4-thia-1-azabicyclo[3.2.0]hept-2-yl)carbonyl-]1,2-benzisothiazol-3(2H)-one 1,1-dioxide, also named as the saccharimide of phenoxymethyl penicillin.

Thereafter, quinoline (14.5 g., 0.112 mole) is added and the stirred solution containing said saccharimide and the mixture is cooled to −30°C. and phosphorus pentachloride (11.6 g., 0.056 mole) is added over a few minutes, keeping the temperature at −30°c. The mixture is stirred for three hours at −30°C. to yield 2-[(6-[1-chloro-2-phenoxyethylideneamino]-3,3-dimethyl-7-oxo-4-thia-1-azabicyclo[3.2.0]hept-2-yl)carbonyl]-1,2-benzisothiazol-3(2H)-one 1,1-dioxide, also known as the saccharimide of 6-chloroimidophenoxymethyl penicillin. A small portion of this mixture is separated and the 6-chloroimide isolated.

Analysis: Calcd for $C_{23}H_{20}ClN_3O_6S_2$: C, 51.73; H, 3.78; Cl, 6.64; N, 7.87; S, 12.01. Found: C, 51.92; H, 3.91; Cl, 6.16; N, 7.76; S, 11.69.

To the remainder of above-described mixture containing said 6-chloroimide, quinoline (6.6 ml., 0.056 mole) is added followed by absolute ethanol (100 ml.) over a few minutes, keeping the temperature at −30° ± 3°C. After stirring, the mixture for one hour at −30°C. the temperature is rapidly raised to +20°C. with hot water, and immediately brought back to −30°C. and stirred for another hour. Then the temperature is brought up to +20°C. with hot water and immediately back to −10°C. and stirred for one more hour to afford 2-[(6-[1-ethoxy-2-phenoxyethylideneamino]-3,3-dimethyl-7-oxo-4-thia-1-azabicyclo[3.2.0]hept-2-yl)carbonyl]-1,2-benzisothiazol-3(2H)-one 1,1-dioxide hydrochloride, also described as the saccharimide of 6-ethoxyimidophenoxymethyl penicillin hydrochloride.

Subsequently, water (75 ml.) is added to above-described mixture containing said 6-ethoxyimide hydrochloride and the temperature is lowered to 0°C. and then stirred for twenty minutes. The mixture is kept at 0°C. overnight and filtered. The solid is washed with cold (5°C.) water (30 ml.), without slurrying the solid in the water, and sucked dry. The solid is then washed with cold (5°C.) methylene chloride (2 × 30 ml.), slurried in absolute ether and sucked dry on the funnel, dried over $P_2O_5$ in a vacuum, giving white crystals of 2-[(6-amino-3,3-dimethyl-7-oxo-4-thia-1-azabicyclo[3.2.0]hept-2-yl)carbonyl]-1,2-benzisothiazol-3(2H)-one 1,1-dioxide, hydrochloride, also known as the saccharimide of 6-amino-penicillanic acid, hydrochloride (11.1–12.6 g., 62–75%), m.p. 176°C. dec. (uncorr.).

Analysis: Calcd for $C_{15}H_{15}N_3O_5S_2 \cdot HCl \cdot 1/2 H_2O$: C, 42.40; H, 4.01; N, 9.84; S, 15.02; Cl, 8.30. Found: C, 42.25; H, 3.83; N, 9.73; S, 15.11; Cl, 11.40.

EXAMPLE IV

2-[(6-Amino-3,3-dimethyl-7-oxo-4-thia-1-azabicyclo[3.2.0]hept-2-yl)carbonyl]-1,2-benzisothiazol-3(2H)-one 1,1-dioxide, hydrochloride (8.6 g., 0.0206 mole) as prepared in Example III, is powdered, added to water (75 ml.) in four portions, and stirred at 0°C. Adjustment to the pH to 6.9 after each addition is done with a 60°c. saturated sodium bicarbonate solution. After the second addition some ether is added to control the foaming. After the final adjustment of the pH to 6.9 the mixture is stirred at 0°–2°C. for 10 minutes, and the pH slowly goes to 7.1. The solid is filtered and washed with cold water (2 ×), and dried in a desiccator over $P_2O_5$ under vacuum at 5°C., giving a white solid which is 2-[(6-amino-3,3-dimethyl-7-oxo-4-thia-1-azabicyclo[3.2.0]hept-2-yl)carbonyl]-1,2-benzisothiazol-3(2H)-one 1,1-dioxide, also described as the saccharimide of 6-aminopenicillanic acid (7.0 g., 90%), m.p. 158°C. dec. (uncorr.).

Analysis: Calcd for $C_{15}H_{15}N_3O_5S_2$: C, 47.23; H, 3.97; N, 11.02; S, 16.81. Found: C, 47.43; H, 3.94; N, 11.21; S, 16.60.

EXAMPLE V

Following the procedure of Examples I-IV, phenoxymethyl penicillin is reacted with a series of saccharimide derivatives to afford the hereinafter listed saccharimide derivatives of phenoxymethyl penicillin, which are contacted with phosphorus pentachloride to afford the corresponding saccharimides of 6-chloroimidophenoxymethyl penicillin which are contacted with an alkanol to yield appropriate saccharimides of 6-alkoxyimidophenoxymethyl penicillin hydrohalides, which are then hydrolyzed and neutralized to produce the following saccharimides of 6-aminopenicillanic acid:

Table A

| Saccharimide Derivatives of Phenoxymethyl Penicillin | Saccharimide Derivatives of 6-Aminopenicillanic Acid |
| --- | --- |
| 5-ethylsaccharimide of phenoxymethyl penicillin | 5-ethylsaccharimide of 6-aminopenicillanic acid |

Table A — Continued

| Saccharimide Derivatives of Phenoxymethyl Penicillin | Saccharimide Derivatives of 6-Aminopenicillanic Acid |
| --- | --- |
| 5-chloro-6-propylsaccharimide of phenoxymethyl penicillin | 5-chloro-6-propylsaccharimide of 6-aminopenicillanic acid |
| 6-nitrosaccharimide of phenoxymethyl penicillin | 6-nitrosaccharimide of 6-aminopenicillanic acid |
| 5,6-dibromosaccharimide of phenoxymethyl penicillin | 5,6-dibromosaccharimide of 6-aminopenicillanic acid |
| 5-hexylsaccharimide of phenoxymethyl penicillin | 5-hexylsaccharimide of 6-aminopenicillanic acid |
| 5-butoxy-6-phenylsaccharimide of phenoxymethyl penicillin | 5-butoxy-6-phenylsaccharimide of 6-aminopenicillanic acid |
| 5-(p-methoxyphenyl)saccharimide of phenoxymethyl penicillin | 5-(p-methoxyphenyl)saccharimide of 6-aminopenicillanic acid |
| 5-phenylsaccharimide of phenoxymethyl penicillin | 5-phenylsaccharimide of 6-aminopenicillanic acid |
| 6-benzylsaccharimide of phenoxymethyl penicillin | 6-benzylsaccharimide of 6-aminopenicillanic acid |
| 7-(m-propoxyphenyl)saccharimide of phenoxymethyl penicillin | 7-(m-propoxyphenyl)saccharimide of 6-aminopenicillanic acid |
| 4-butyl-5-fluorosaccharimide of phenoxymethyl penicillin | 4-butyl-5-fluorosaccharimide of 6-aminopenicillanic acid |

EXAMPLE VI

Repeating the procedure of Examples I–IV, to react a series of saccharimide derivatives with benzyl penicillin there is produced the hereafter set forth saccharimide derivatives of benzyl penicillin which are contacted with phosphorus pentabromide to afford the corresponding saccharimides of 6-bromoimidobenzyl penicillin which are contacted with an alkanol to yield appropriate saccharimides of 6-alkoxyimidobenzyl penicillin hydrobromide which are then hydrolyzed and neutralized to produce the following saccharimides of 6-aminopenicillanic acid:

Table B

| Saccharimide Derivatives of Benzyl Penicillin | Saccharimide Derivatives of 6-Aminopenicillanic Acid |
| --- | --- |
| 5-methyl-6-(2-pyridyl)saccharimide of benzyl penicillin | 5-methyl-6-(2-pyridyl)saccharimide of 6-aminopenicillanic acid |
| 5-trifluoromethylsaccharimide of benzyl penicillin | 5-trifluoromethylsaccharimide of 6-aminopenicillanic acid |
| 6-dimethylamino-7-methyl saccharimide of benzyl penicillin | 6-dimethylamino-7-methyl saccharimide of 6-aminopenicillanic acid |
| 7-diethylaminosaccharimide of benzyl penicillin | 7-diethylaminosaccharimide of 6-aminopenicillanic acid |
| 5-carbomethoxysaccharimide of benzyl penicillin | 5-carbomethoxysaccharimide 6-aminopenicillanic acid |
| 6-sulfamidosaccharimide of benzyl penicillin | 6-sulfamidosaccharimide of 6-aminopenicillanic acid |
| 5-carbethoxysaccharimide of benzyl penicillin | 5-carbethoxysaccharimide of 6-aminopenicillanic acid |
| 6-cyanosaccharimide of benzyl penicillin | 6-cyanosaccharimide of 6-aminopenicillanic acid |
| 5-propylthiosaccharimide of benzyl penicillin | 5-propylthiosaccharimide of 6-aminopenicillanic acid |
| 5-ethylsulfonylsaccharimide of benzyl penicillin | 5-ethylsulfonylsaccharimide of 6-aminopenicillanic acid |
| 6-(4-pyridyl)saccharimide of benzyl penicillin | 6-(4-pyridyl)saccharimide of 6-aminopenicillanic acid |
| 5,6-benzosaccharimide of benzyl penicillin | 5,6-benzosaccharimide of 6-aminopenicillanic acid |

EXAMPLE VII 6-(3-Hexenamido)-3,3-dimethyl-7-oxo-4-thia-1-azabicyclo[3.2.0]heptane-2-carboxylic acid, also described as 2-pentenyl penicillin, (0.040 mole) is added to anhydrous methylene chloride (150 ml.) contained in a dry 500 ml. three neck round bottom flask equipped with a stirrer, a drying tube and a thermometer through a U-tube nitrogen inlet. Then triethylamine (0.040 mole) is added, and the solution is cooled to 5°C. in ice. Pseudosaccharin chloride (0.040 mole) is added all at once, giving a yellow solution. The solution is stirred for one-half hour at 5°C., and kept at room temperature overnight. The solution is then brought to the boiling point for five minutes, allowed to cool to room temperature, filtered and the collected solid is 2-[(6-[2-hexenamido]-3,3-dimethyl-7-oxo-4-thia-1-azabicyclo[3.2.0]hept-2-yl)carbonyl]-1,2-benzisothiazol-3(2H)-one 1,1-dioxide, also named as the saccharimide of 2-pentenyl penicillin.

Repeating the above procedure, to react appropriate penicillins with various saccharin chloride derivatives, the following penicillin saccharimides are obtained:

2-[(6-[2-allylmercaptoacetamido]-3,3-dimethyl-7-oxo-4-thia-1-azabicyclo[3.2.0]hept-2-yl)carbonyl]-5-chloro-1,2-benzisothiazol-3(2H)-one 1,1-dioxide, also known as the 5-chlorosaccharimide of allylmercaptomethyl penicillin;

2-[(6-[2-(γ-chlorocrotylmercapto)acetamido]-3,3-dimethyl-7-oxo-4-thia-1-azabicyclo[3.2.0]hept-2-yl)carbonyl]-1,2-benzisothiazol-3(2H)-one 1,1-dioxide, also described as the saccharimide of γ-chlorocrotylmercaptomethyl penicillin;

2-[(3,3-dimethyl-7-oxo-6-[2-phenylacetamido]-4-thia-1-azabicyclo[3.2.0]hept-2-yl)carbonyl]-1,2-benzisothiazol-3(2H)-one 1,1-dioxide, also named as the saccharimide of benzyl penicillin;

2-[(6-hexanamido-3,3-dimethyl-7-oxo-4-thia-1-azabicyclo[3.2.0]hept-2-yl)carbonyl]-1,2-benzisothiazol-3(2H)-one 1,1-dioxide, also defined as the saccharimide of amyl penicillin;

2-[(3,3-dimethyl-6-octanamido-7-oxo-4-thia-1-azabicyclo[3.2.0]hept-2-yl)carbonyl]-1,2-benzisothiazol-3(2H)-one 1,1-dioxide, also named as the saccharimide of heptyl penicillin; and 2-[(6-[2-(p-hydroxyphenyl)acetamido]-3,3-dimethyl-7-oxo-4-thia-1-azabicyclo[3.2.0]hept-2-yl)carbonyl]-1,2-benzisothiazol-3(2H)-one 1,1-dioxide, also described as the saccharimide of hydroxybenzyl penicillin.

EXAMPLE VIII

The saccharimide of 2-pentenyl penicillin, as prepared in Example VII, is admixed with methylene chloride (150 ml.) quinoline (0.110 mole), the stirred mixture is cooled to −10°C. and phosphorus pentachloride (0.055 mole) is added over a few minutes. The resulting mixture is stirred at −10°C., thereafter the precipitate is separated by filtration to yield the saccharimide of the 6-chloroimido-2-pentenyl penicillin.

In a similar manner, the other penicillin saccharimides of Example VII are reacted with phosphorus pentahalides to afford:

5-chlorosaccharimide of 6-chloroimidoallylmercaptomethyl penicillin;

saccharimide of 6-bromoimido-γ-chlorocrotylmercaptomethyl penicillin;

saccharimide of 6-chloroimidobenzyl penicillin;

saccharimide of 6-chloroimidoamyl penicillin;

saccharimide of 6-chloroimidoheptyl penicillin; and saccharimide of 6-chloroimidohydroxybenzyl penicillin.

EXAMPLE IX

The saccharimide of the 6-chloroimido-2-pentenyl penicillin, as prepared in Example VIII, is admixed with methylene chloride (150 ml.), quinoline (0.055 mole) and absolute methanol (100 ml.), keeping the temperature at −30°C. ± 3°C. After stirring, the mixture for one hour at −30°C. the temperature is rapidly raised to +20°C. with hot water, and brought back to −30°C. and stirred for another hour. Then the temperature is brought up to +20°C. with hot water and quickly back to −10°C. and stirred for one more hour to produce the saccharimide of 6-methoxyimido-2-pentenyl penicillin, hydrochloride which is separated by filtration.

In like manner, the 6-haloimido penicillin saccharimides of Example VIII are reacted with various alkanols to yield:

saccharimide of 6-ethoxyimido-2-pentenyl penicillin, hydrochloride;

saccharimide of 6-pentoxyimido-2-pentenyl penicillin, hydrochloride;

5-chlorosuccharimide of 6-methoxyimidoallylmercaptomethyl penicillin, hydrochloride;

5-chlorosaccharaimide of 6-ethoxyimidoallylmercaptomethyl penicillin, hydrochloride;

5-chlorosaccharimide of 6-butoxyimidoallylmercaptomethyl penicillin, hydrochloride;

saccharimide of 6-methoxyimido-γ-chlorocrotylmercaptomethyl penicillin, hydrobromide;

saccharimide of 6-ethoxyimido-γ-chlorocrotylmercaptomethyl penicillin, hydrobromide;

saccharimide of 6hexoxyimido-γ-chlorocrotylmercaptomethyl penicillin, hydrobromide;

saccharimide of 6-ethoxyimidobenzyl penicillin, hydrochloride;

saccharimide of 6-butoxyimidobenzyl penicillin, hydrochloride;

saccharimide of 6-ethoxyimidoamyl penicillin, hydrochloride;

saccharimide of 6-propoxyimidoamyl penicillin, hydrochloride;

saccharimide of 6-methoxyimidoamyl penicillin, hydrochloride;

saccharimide of 6-methoxyimidoheptyl penicillin, hydrochloride;

saccharimide of 6-ethoxyimidoheptyl penicillin, hydrochloride;

saccharimide of 6-butoxyimidoheptyl penicillin, hydrochloride;

saccharimide of 6-methoxyimidohydroxybenzyl penicillin, hydrochloride;

saccharimide of 6-ethoxyimidohydroxybenzyl penicillin, hydrochloride; and saccharimide of 6-butoxyimidohydroxybenzyl penicillin, hydrochloride.

EXAMPLE X

The saccharimide of 6-methoxyimido-2-pentenyl penicillin hydrochloride, as prepared in Example IX, is added to methanol (100 ml.), water (75 ml.) and the temperature is lowered to 0°C. with stirring for one-half hour. The mixture is kept at 0°C. overnight and filtered. The solid is washed with cold (5°C.) water (30 ml.), without slurrying the solid in the water, and dried. The solid is then washed with cold (5°C.) methylene chloride (2 × 30 ml.), slurried in absolute ether and dried on the funnel, dried over $P_2O_5$ in a vacuum, giving crystals of the saccharimide of 6-aminopenicillanic acid, hydrochloride.

In the same manner, the other 6-alkoxyimido penicillin saccharimide, hydrohalides of Example IX are converted to the corresponding saccharimide of 6-aminopenicillanic acid, hydrohalides.

When the above-prepared hydrohalides are neutralized by the procedure of Example IV, the appropriate saccharimides of 6-aminopenicillanic acid are obtained.

EXAMPLE XI

Triethylammonium 3-acetoxymethyl-8-oxo-5-thia-7-(thiophene-2-acetamido)-1-azabicyclo[4.2.0]oct-2-en-2carboxylate (0.040 mole) is added to anhydrous methylene chloride (150 ml.) contained in a dry 500 ml. three neck round bottom flask equipped with a stirrer, a drying tube and a thermometer. Thereafter, the solution is cooled to 5°C. in ice and pseudosaccharin chloride (0.040 mole) is added all at once, giving a yellow solution. The solution is stirred for one-half hour at 5°C., and kept at room temperature overnight. The solution is then brought to the boiling point for five minutes, and allowed to cool to room temperature to afford 2-[3-hydroxymethyl-8-oxo 7-(2-thiopheneacetamido)-5-thia-1-azabicyclo[4.2.0]oct-2-en-2-ylcarbonyl]-1,2-benzisothiazol-3(2H)-one 1,1-dioxide, acetate, also designated as the saccharimide of cephalothin, m.p. 160°C. dec. (uncorr.).

Thereafter, quinoline (0.110 mole) is added to the stirred solution containing said saccharimide. The mixture is cooled to −30°C. and phosphorus pentachloride (11.6 g., 0.056 mole) is added over a few minutes, keeping the temperature at −30°C. The mixture is stirred for three hours at −30°C. to yield 2-[7-(1-chloro-2-[2-thienyl]ethylideneamino)-3-hydroxymethyl-8-oxo-5-thia-1-azabicyclo[4.2.0]oct-2-en-2-ylcarbonyl]-1,2-benzisothiazol-3(2H)-one 1,1-dioxide, acetate, also known as the saccharimide of 7-chloroimidocephalothin.

To the above-described mixture containing said 7-chloroimide, quinoline (0.055 mole) is added followed by absolute ethanol (100 ml.) over a few minutes, keeping the temperature at −30°C. ± 3°C. After stirring, the mixture for one hour at −30°C. the temperature is rapidly raised to +20°C. with hot water, and immediately brought back −30°C. and stirred for another hour. Then the temperature is brought up to +20°C. with hot water and immediately back to −10°C. and stir for one more hour to afford 2-[7-(1-ethoxy-2-[2-thienyl]ethylideneamino)-3-hydroxymethyl-8-oxo-5-thia-1-azabicyclo[4.2.0]oct-2-en-2-ylcarbonyl]-1,2-benzisothiazol-3(2H)-one 1,1-dioxide, acetate, hydrochloride, also described as the saccharimide of 7-ethoxyimidocephalothin, hydrochloride.

Subsequently, water (75 ml.) is added to abovedescribed mixture containing said 7-ethoxyimide hydrochloride and the temperature is lowered to 0°C. and then stirred for twenty minutes. The mixture is kept at 0°C. overnight and filtered. The solid is washed with cold (5°C.) water (30 ml.), without slurrying the solid in the water, and sucked dry. The solid is then washed with cold (5°C.) methylene chloride (2 × 30 ml.), slurried in absolute ether and dried on the funnel, dried over $P_2O_5$ in a vacuum, giving crystals of 2-[7-amino-3-hydroxymethyl-8-oxo-5-thia-1-azabicyclo[4.2.0]oct-2-en-2-ylcarbonyl]-1,2-benzisothiazol-3(2H)-one 1,1-dioxide, acetate, hydrochloride, also known as the saccharimide of 7-aminocephalosporanic acid, hydrochloride.

EXAMPLE XII

2-[7-Amino-3-hydroxymethyl-8-oxo-5-thia-1-azabicyclo[4.2.0]oct-2-en-2-ylcarbonyl]-1,2-benzisothiazol-3(2H)-one 1,1-dioxide, acetate, hydrochloride (0.02 mole), as prepared in Example XI, is powdered and added to water (75 ml.) in four portions, stirred at 0°C. Adjustment of the pH to 6.9 after each addition is done with a 60°C. saturated sodium bicarbonate solution. After the second addition some ether is added to control the foaming. After the final adjustment of the pH to 6.9 the mixture is stirred at 0°–2°C. for 10 minutes, and the pH slowly goes to 7.1. The solid is filtered and washed with cold water (2 ×), and dried in a desiccator over $P_2O_5$ under vacuum at 5°C., giving a white solid which is 2-[7-amino-3-hydroxymethyl-8-oxo-5-thia-1-azabicyclo[4.2.0]oct-2-en-2-ylcarbonyl]-1,2-benzisothiazol-3(2H)-one 1,1-dioxide, acetate, also described as the saccharimide of 7-aminocephalosporanic acid.

EXAMPLE XIII

2-[7-Amino-3-hydroxymethyl-8-oxo-5-thia-1-azabicyclo[4.2.0]oct-2-en-2-ylcarbonyl]-1,2-benzisothiazol-3(2H)-one 1,1-dioxide, acetate as prepared in Example XII, is dissolved in tetrahydrofuran (60 ml.) and a solution of sodium bicarbonate (0.04 mole) in water (40 ml.) is added all at once. The mixture is stirred for three hours at room temperature giving a solution. Then the tetrahydrofuran is removed at 30°C. under vacuum, and the resulting mixture is washed with methylene chloride. The aqueous fraction is than placed on a rotary evaporator at 30°C. and the dissolved methylene chloride is removed. The solution is filtered and the pH adjusted to 3.8 with glacial acetic acid. The mixture is stirred in ice-water for one-half hour and then filtered, giving crystals of 7-amino-3-(hydroxymethyl)-8-oxo-5-thia-1-azabicyclo[4.2.0]oct-2-en-2-carboxylic acid, acetate, also known as 7-aminocephalosporanic acid.

EXAMPLE XIV

Utilizing the general procedures of Examples VII–X, a series of 2-amido derivatives of natural penicillins are prepared which are reacted with phosphorus pentachloride to yield their corresponding 2-amino-6-chloroimidopenicillins which are then reacted with an alkanol to afford appropriate 2-amido-6-alkoxyimidopenicillin hydrochlorides which are then hydrolyzed and neutralized to afford 2-amido-6-aminopenicillanic acids having the formula:

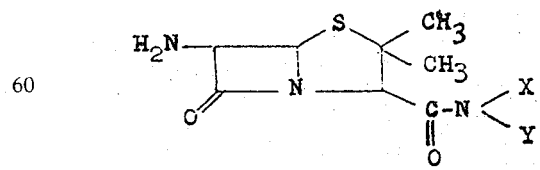

wherein X and Y when taken separately are defined as follows:

| X | Y |
|---|---|
| cyano | cyano |
| cyano | nitro |
| cyano | trifluoromethylsulfonyl |
| cyano | carbopentoxy |
| cyano | N,N-dimethylcarbamyl |
| cyano | ethylsulfonyl |
| cyano | N,N-diethylsulfamyl |
| nitro | trifluoromethylsulfonyl |
| nitro | carbethoxy |
| nitro | N,N-dipropylcarbamyl |
| nitro | methylsulfonyl |
| nitro | N-ethyl-N-methylsulfamyl |
| trifluoromethylsulfonyl | trifluoromethylsulfonyl |
| trifluoromethylsulfonyl | carbohexoxy |
| trifluoromethylsulfonyl | N-ethyl-N-methylcarbamyl |
| trifluoromethylsulfonyl | propylsulfonyl |
| trifluoromethylsulfonyl | N,N-dimethylsulfamyl |
| carbomethoxy | N,N-dipentylcarbamyl |
| carbomethoxy | methylsulfonyl |
| carbomethoxy | N,N-dimethylsulfamyl |
| N,N-dimethylcarbamyl | pentylsulfonyl |
| N,N-dimethylcarbamyl | N,N-dimethylsulfamyl |
| N,N-dimethylcarbamyl | N,N-dimethylcarbamyl |
| N,N-dimethylsulfamyl | N,N-dimethylsulfamyl |
| cyano | p-butylbenzoyl |
| cyano | m-toluyl |
| cyano | p-phenoxybenzoyl |
| methylsulfonyl | o-chlorobenzoyl |
| methylsulfonyl | 2,4-dibromobenzoyl |
| carbethoxy | p-chloro-m-toluyl |
| carbethoxy | p-iodobenzoyl |
| N,N-dimethylcarbamyl | p-ethylbenzoyl |
| carbobutoxy | p-methoxybenzoyl |
| nitro | p-phenylbenzoyl |
| p-nitrophenylsulfonyl | m-nitrobenzoyl |
| p-trifluoromethylphenyl-sulfonyl | p-methylsulfonylbenzoyl |
| 2,4-dinitrophenylsulfonyl | p-toluyl |
| p-chlorophenylsulfonyl | p-methoxybenzoyl |
| trifluoromethylsulfonyl | p-(N,N-dimethylsulfamyl)benzoyl |
| m-(N,N-diethylsulfamyl)benzoyl | methylsulfonyl |
| carbomethoxy | p-trifluoromethylbenzoyl |
| cyano | o-chlorophenylsulfonyl |
| cyano | m-trifluoromethylphenylsulfonyl |
| trifluoromethylsulfonyl | p-nitrophenylsulfonyl |
| N,N-dimethylcarbamyl | 2-bromo-4-chlorophenylsulfonyl |

EXAMPLE XV

When the procedures of Examples XI-XIII XIII are repeated, a series of 2-amido derivatives of cephalothin are prepared which are reacted with a phosphorus pentahalide to yield their corresponding 2-amido-7-haloimidocephalothins which are reacted with an alkanol to afford appropriate 2-amido-7-alkoxyimidocephalothin hydrohalides which are then hydrolyzed and neutralized to produce 2-amido-7-aminocephalosporanic acids having the formula:

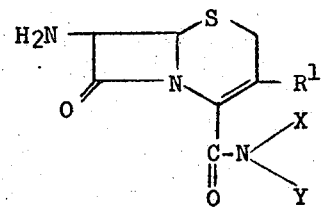

$R^1$ is defined as follows and X and Y when taken separately are defined as follows:

| X | Y | $R^1$ |
|---|---|---|
| methylsulfonyl | 2-bromo-4-nitrophenylsulfonyl | $CH_3$ |
| N,N-dimethylsulfamyl | m-(N,N-dimethylcarbamyl)phenylsulfonyl | $CH_2OH$ |
| carbohexoxy | p-methylsulfonylphenylsulfonyl | $CH_2OCOCH_3$ |
| carbethoxy | p-(N,N-diethylsulfamyl)phenylsulfonyl | $CH_2OCOCH_3$ |
| trifluoromethylsulfonyl | 4-cyano-2-iodophenylsulfonyl | $CH_3$ |
| cyano | 2-fluoro-4-nitrophenylsulfonyl | $CH_2OH$ |
| pentylsulfonyl | p-carbobutoxyphenylsulfonyl | $CH_2OCOCH_3$ |
| cyano | p-iodobenzylsulfonyl | $CH_3$ |
| cyano | butyryl | $CH_2OCOCH_2CH_3$ |
| nitro | acetyl | $CH_3$ |
| cyano | benzoyl | $CH_2OCOCH_3$ |
| propionyl | phenylsulfonyl | $CH_2OH$ |
| 2,4,6-trimethylbenzoyl | phenethylsulfonyl | $CH_2OCOCH_3$ |
| 2,4,6-trimethylbuezoyl | p-methoxyphenylsulfonyl | $CH_2OH$ |
| N,N-dimethylcarbamyl | N,N-dimethylaminoethylsulfonyl | $CH_2OCOCH_3$ |
| 2,3,5,6-tetramethylbenzoyl | p-methylthiophenylsulfonyl | $CH_2OCOCH_3$ |
| cyclovaleryl | m-nitrophenethylsulfonyl | $CH_2OH$ |
| N,N-dipropylaminobutylsulfonyl | 2-naphthoyl | $CH_2OCOCH_3$ |
| cyano | 2,4-dimethylbenzoyl | $CH_2OCOCH_3$ |
| nitro | p-fluorophenacetyl | $CH_2OCOCH_3$ |
| cyclocaproyl | trifluoromethylsulfonyl | $CH_2OCOCH_2CH_3$ |
| furoyl | cyano | $CH_3$ |
| N,N-dimethylsulfamylphenpropionyl | carbopropoxy | $CH_2OH$ |
| p-propylphenylsulfonyl | cyclobutyryl | $CH_3$ |
| 2-naphthylsulfonyl | p-butoxybenzoyl | $CH_2OCOCH_3$ |
| phenbutyryl | nitro | $CH_2OCOCH_3$ |
| 2-furylsulfonyl | caproyl | $CH_3$ |
| 2-pyridylsulfonyl | methylsulfonyl | $CH_2OCOCH_3$ |
| phencaproyl | cyano | $CH_2OH$ |
| phenpropylsulfonyl | trifluoromethylsulfonyl | $CH_2OCOCH_3$ |
| p-propylsulfonylphenylsulfonyl | cyano | $CH_3$ |
| nitro | p-(N,N-dibutylcarbamyl)phenylsulfonyl | $CH_2OH$ |
| m-carbomethoxyphenylsulfonyl | carbethoxy | $CH_2OCOCH_3$ |
| p-propoxyphenylsulfonyl | methylsulfonyl | $CH_2OCOCH_3$ |
| cyano | p-pentylthiophenylsulfonyl | $CH_3$ |

EXAMPLE XVI

When the procedures of Examples VII–X are repeated, a series of 2-cycloamido derivatives of natural penicillins are prepared which are reacted with phosphorus pentachloride to yield their corresponding 2-cycloamido-6-chloroimidopenicillins which are then reacted with an alkanol to afford appropriate 2-cycloamido-6-alkoxyimidopenicillin hydrochlorides which are then hydrolyzed and neutralized to afford 2-cycloamido-6-aminopenicillanic acids having the formula:

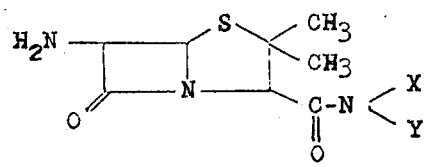

wherein X and Y when taken together are defined:
3-oxo-1,2-benzisothiazolin-2-yl, 1,1-dioxide;
4-methoxyphthalimido;
maleimido;
succinimido;
3-oxo-4,1,2-benzoxathiazin-2(3H)-yl, 1,1-dioxide;
3-oxo-6-nitro-1,4,2-benzodithiazin-2(3H)-yl, 1,1-dioxide;
3,4-dihydro-4-methyl-3-oxo-2H-1,2,4-benzothiadiazin-2-yl, 1,1-dioxide;
3,3,4,4-tetramethyl-2-oxo-1-pyrrolidinyl;
6-bromo-3,4-dihydro-2,4-dioxo-2H-1,3-benzoxazin-3-yl;
3,4-dihydro-2,4-dioxo-2H-1,3-benzothiazin-3-yl;
7-ethylsulfonyl-1,4-dihydro-1-methyl-2,4-dioxo-3(2H)quinazolinyl;
6-fluoro-1,2-benzisothiazolin-2-yl, 1,1-dioxide;
1-oxo-2-isoindolinyl;
2-oxo-3-pyrrolin-1-yl;
4-isothiazolin-2-yl, 1,1-dioxide;
6-chloro-3,4-dihydro-7-methyl-3-oxo-2H-1,2-benzothiazin-2-yl, 1,1-dioxide;
3,4-dihydro-1,3-dioxo-2(1H)-isoquinolyl; and
o-(3-bromobenzene)disulfonimido.

EXAMPLE XVII

When the procedures of Examples XI–XIII are repeated, a series of 2-cycloamido derivatives of cephalothin are prepared which are reacted with phosphorus pentabromide to yield their corresponding 2-cycloamido-7-bromoimido-cephalothins which are reacted with an alkanol to afford appropriate 2-cycloamido-7-alkoxyimidocephalothin hydrobromides which are then hydrolyzed and neutralized to produce 2-cycloamido-7-aminocephalosporanic acids having the formula:

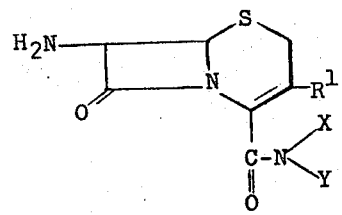

wherein $R^1$ is defined as follows and X and Y when taken together are defined:

| X and Y | $R^1$ |
|---|---|
| 5-ethyl-3-oxo-1,2-benzisothiazolin-2-yl, 1,1-dioxide | $CH_2OCOCH_3$ |
| phthalimido | $CH_2OH$ |
| succinimido | $CH_3$ |
| 3-oxo-2-isothiazolidinyl, 1,1-dioxide | $CH_2OCOCH_3$ |
| 3-oxo-4-isothiazolin-2-yl, 1,1-dioxide | $CH_2OCOCH_3$ |
| 6,7-dichloro-3-oxo-4,1,2-benzoxathiazin-2(3H)-yl, 1,1-dioxide | $CH_2OCOCH_3$ |
| 3-oxo-1,4,2-benzodithiazin-2(3H)-yl, 1,1-dioxide | $CH_2OCOCH_3$ |
| 6-cyano-3,4-dihydro-4-methyl-3-oxo-2H-1,2,4-benzothiadiazin-2-yl,1,1-dioxide | $CH_2OH$ |
| tetramethylsuccinimido | $CH_3$ |
| 3,4-dihydro-2,4-dioxo-2H-1,3-benzoxazin-3-yl | $CH_2OCOCH_3$ |
| 7-trifluoromethyl-3,4-dihydro-2,4-dioxo-2H-1,3-benzothiazin-3-yl | $CH_2OCOCH_3$ |
| 1,4-dihydro-1-methyl-2,4-dioxo-3(2H)quinazolinyl | $CH_2OH$ |
| 1,2-benzisothiazolin-2-yl, 1,1-dioxide | $CH_2OH$ |
| 5-benzyl-1-oxo-2-isoindolinyl | $CH_3$ |
| 2-isothiazolidinyl, 1,1-dioxide | $CH_2OCOCH_2CH_3$ |
| 2-oxo-1-pyrrolidinyl | $CH_2OCOCH_3$ |
| 3,4-dihydro-3-oxo-2H-1,2-benzothiazin-2-yl, 1,1-dioxide | $CH_3$ |
| 7-carbomethoxy-3,4-dihydro-1,3-dioxo-2(1H)-isoquinolyl | $CH_2OH$ |
| o-benzenedisulfonimido | $CH_2OCOCH_3$ |

EXAMPLE XVIII 3,3-Dimethyl-7-oxo-6-(2-phenoxyacetamido)-4-thia-1-azabicyclo[3.2.0]heptane-2-carboxylic acid, also described as phenoxymethyl penicillin is added to anhydrous methylene chloride (2 liters) and the mixture is stirred and cooled in ice to 6°C. Then triethylamine (78.8 g., 0.73 mole) is added and washed in with anhydrous methylene chloride (250 ml.), causing the solid to dissolve. The solution is cooled to 5°C. and ψ-saccharin chloride (147 g., 0.73 mole) is added and washed in with anhydrous methylene chloride (250 ml.). The light yellow solution is stirred at 5°–10°C. for one-half hour, and then kept at room temperature overnight. Quinoline (213 ml., 1.8 mole) is added to the stirred solution, the internal temperature is quickly lowered to −30°C. As soon as the temperature reached −30°C. powdered phosphorus pentachloride (187 g., 0.90 mole) is added over about three minutes while the temperature is maintained at −28° to −30°C. The mixture is stirred for three hours at −30°C. and a solution of quinoline (105 ml., 0.90 mole) in absolute ethanol (850 ml.) is added over about 10 minutes, while maintaining the temperature at −27° to −30°C. After stirring for one hour at −30°C. the temperature is rapidly raised to +20°C., and then immediately lowered to −30°C. After stirring another hour at −30°C. the temperature is rapidly raised to +20°C. and then immediately lowered to −10°C. The temperature is maintained at −10°C. for one hour, water (650 ml.) is added and the mixture stirred at 0°C. for 20 minutes. The mixture is stored at 0°C. overnight and filtered through a coarse sintered funnel. The off-white solid is slurried three times with cold (5°C.) methylene chloride, three times with cold water (just enough to cover the solid), and two times with anhydrous ether. The resulting white solid is spread out on paper in a hood and air-dried overnight, giving a powdery white solid which is 2-[(6-amino-3,3-dimethyl-7-oxo-4-thia-1-azabicyclo[3,2,0]hept-2-yl)carbonyl]-1,2-benzisothiazol-3(2H)-one, 1,1-dioxide hydrochloride, as named as the saccharimide of 6-aminopenicillanic acid, hydrochloride (212–210 g., 62%).

EXAMPLE XIX

2-[(D-[2-amino-2-phenylacetamido]-3,3-dimethyl-7-oxo-4-thia-1-azabicyclo[3.2.0]hept-2-yl)carbonyl]-1,2-benzisothiazol-3(2H)-one 1,1-dioxide, also described as the saccharimide of ampicillin, (0.02 mole) is dissolved in anhydrous methylene chloride (75 ml.) and N,N-dimethylaniline (0.07 mole) is added. The solution is cooled to −40°C. by an acetone-dry ice bath, and phosphorus pentabromide (0.218 mole) is added over a few minutes under nitrogen. The solution is kept at −35° to −40°C. for three hours with mechanical stirring. After approximately one-half to one hour at this temperature, a white crystalline material forms which is 2[(D-[2-amino-1-bromo-2-phenylethylideneamino]-3,3-dimethyl-7-oxo-4-thia-1-azabicyclo[3,2,0]hept-2-yl)carbonyl]-1,2-benzisothiazol-3(2H)-one 1,1-dioxide, also known as the saccharimide of 6-bromoimidoampicillin. Then 1-butanol (75 ml.) is added over approximately five minutes at −35° to −40°C. and this temperature is maintained for three hours to afford 2[(D-[2-amino-1-butoxy-2-phenylethylideneamino]-3,3-dimethyl-7-oxo-4-thia-1-azabicyclo[3,2,0]hept-2-yl)carbonyl]-1,2-benzisothiazol-3(2H)-one 1,1-dioxide hydrobromide, also named as the saccharimide of 6-butoxyimidoampicillin hydrobromide. Then water (40 ml.) is added to the rapidly stirred mixture allowing the temperature to cool to 0°–5°C. The mixture is stirred at 0°–5°C. for one hour and then kept at 0°C. overnight, without stirring. The mixture is filtered and the solid is washed with anhydrous ether giving a white solid which is the hydrobromide of 2-[(6-amino-3,3-dimethyl-7-oxo-4-thia-1-azabicyclo[3.2.0]hept-2-yl)carbonyl]-1,2-benzisothiazol-3(2H)-one 1,1-dioxide, also described as the saccharimide of 6-aminopenicillanic acid, hydrobromide.

EXAMPLE XX

2-[(6-Amino-3,3-dimethyl-7-oxo-4-thia-1-azabicyclo[3.2.0]hept-2-yl)carbonyl]-1,2-benzisothiazol-3(2H)-one 1,1-dioxide hydrobromide, also described as the saccharimide of 6-aminopenicillanic acid hydrobromide (0.02 mole) is dissolved in tetrahydrofuran (60 ml.) and a solution of sodium bicarbonate (3.36 g., 0.04 mole) in water (40 ml.) is added all at once. The mixture is stirred for three and a half hours at room temperature giving a solution. Then the tetrahydrofuran is stripped off at 30°C. under vacuum, and the resulting mixture is washed with methylene chloride. The aqueous fraction is then placed on a rotary evaporator at 30°C. and the methylene chloride is removed. The solution is filtered and the pH adjusted to 3.8 with glacial acetic acid. The mixture is stirred in ice-water for 20 minutes and then filtered, giving white crystals of 6-amino-3,3-dimethyl-7-oxo-4-thia-1-azabicyclo[3.2.0]heptane-2-carboxylic acid, also known as 6-aminopenicillanic acid.

EXAMPLE XXI

Saccharimide of Benzyl Penicillin

Triethylammonium 3,3-dimethyl-7-oxo-6-(2-phenylacetamido)-4-thia-1-azabicyclo[3.2.0]heptane-2-carboxylate (benzyl penicillin) (105 g., 0.222 mole) is dissolved in methylene chloride (2.5 l.) and the solution is cooled to 3° in ice water. Then 3-chloro-1,2-benzisothiazole 1,1-dioxide (44.8 g., 0.222 mole) is added to the magnetically stirred solution all at once. The resulting solution is reacted and worked-up in a manner similar to Example I. The resulting solution is concentrated at 40° under vacuum, giving white crystals (70 g., 63%), m.p. 198° dec. (uncorr.), that are washed with cold methylene chloride and anhydrous ether. The filtrate of the crystals yields an additional amount of crude yellow solid (19.5 g.).

Analysis: Calcd for $C_{23}H_{21}N_3O_6S_2$: C, 55.30; H, 4.23; N, 8.41; S, 12.84. Found: C, 55.21; H, 4.12; N, 8.41; S, 12.65; $H_2O$, 0.16.

EXAMPLE XXII

The Saccharimide of Phenoxymethyl Penicillin 3,3-Dimethyl-7-oxo-6-(2-phenoxyacetamido)-4-thia-1-azabicyclo[3.2.0]heptane-2-carboxylic acid (phenoxymethyl penicillin) (17.5 g., 0.05 mole) is added to anhydrous methylene chloride (750 ml.) followed by triethylamine (5.05 g., 0.05 mole), giving a solution. The magnetically stirred solution is cooled to 3° in ice-water. 3-Chloro-1,2-benzisothiazole 1,1,-dioxide (10.05 g., 0.05 mole) is added all at once, giving a light yellow solution. After stirring for ½ hour in ice-water the solution is kept over night at room temperature. The solution is washed with cold water (700 ml.), cold 0.13 M/pH7.4/($K_2HPO_4$/$KH_2PO_4$) (500 ml.), and dried through sodium sulfate. The filtrate is dried over calcium sulfate, and then concentrated at 40° under vacuum, giving a foam (24.2 g.). The foam is dissolved in 25% ether in benzene (approx. 80 ml.), giving crystals (18.6 g., 70%), m.p. 171° dec. (uncorr.), before the solution could be filtered.

Analysis: Calcd for $C_{23}H_{21}N_3O_7S_{.0.7}H_2O$: C, 52.30; H, 4.27; N, 7.96; S, 12.14; $H_2O$, 2.38. Found: C, 52.22; H, 3.91; N, 7.89; S, 12.18; $H_2O$, 2.35.

What is claimed is:

1. A compound of the formula:

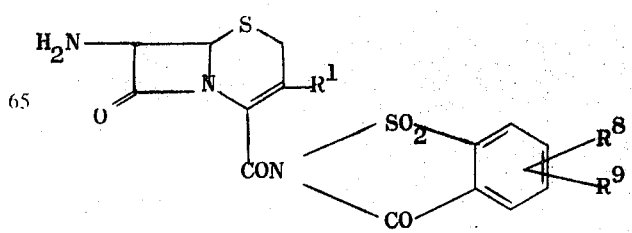

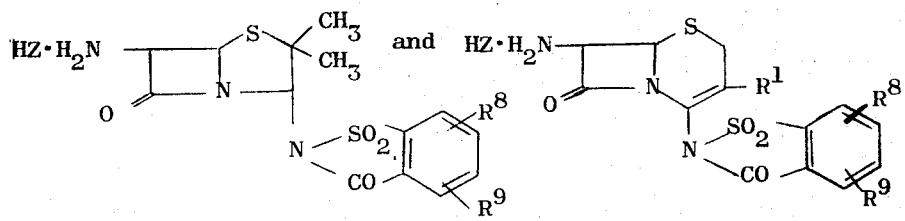

wherein
R[1] is a member selected from the group consisting of methyl, hydroxymethyl, and (lower)alkanoyloxymethyl;
R[8] and R[9] are independently members selected from the group consisting of hydrogen and lower alkyl; and acid addition salts thereof.

2. The compound of claim 1, 2-[3-acetoxymethyl-7-amino-8-oxo-5-thia-1-azabicyclo[4.2.0]oct-2-en-2-ylcarbonyl]-1,2-benzisothiazol-3(2H)-one 1,1-dioxide, hydrochloride.

3. The compound of claim 1, 2-[7-amino-3-hydroxymethyl-8-oxo-5-thia-1-azabicyclo[4.2.0]oct-2-en-2-ylcarbonyl]-1,2-benzisothiazol-3(2H)-one, 1,1-dioxide, acetate.

4. A process which comprises
a. contacting a phosphorus pentahalide in the presence of an acid acceptor and an inert organic solvent with a compound selected from the formulae:

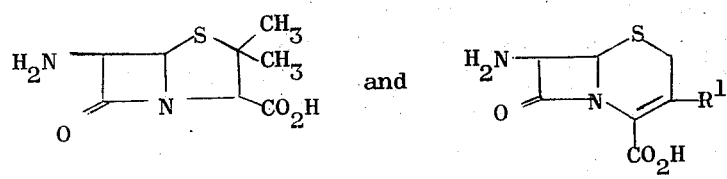

b. reacting the haloimidoyl product with a lower alkanol to produce a lower alkoxyimido hydrohalide; and
c. hydrolyzing said lower alkoxyimido hydrohalide essentially by contact with water to yield a product selected from those of the formulae:

Z represents the halide employed as phosphorus pentahalide;
R[1] is selected from the group consisting of methyl, hydroxymethyl and (lower)alkanoyloxymethyl;

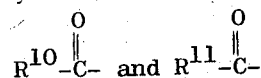

represent acyl moieties present in natural and synthetic penicillin and cephalosporin derivatives;
R[8] and R[9], when taken separately, are independently members selected from the group consisting of hydrogen and lower alkyl; and
acid addition salts thereof.

5. A process for preparing a 2-carboxy amine compound having one of the formulae:

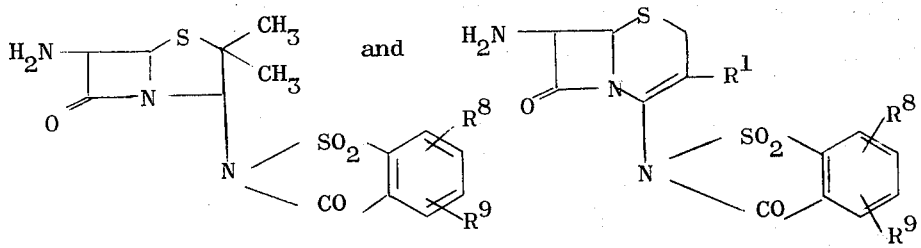

which comprises contacting a 2-amido amine compound having one of the formulae:

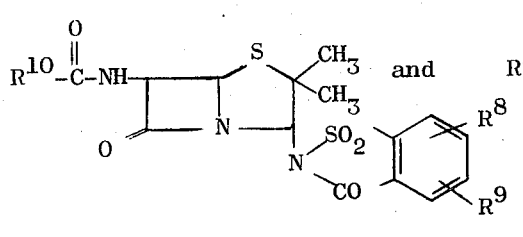

R[1] is selected from the group consisting of methyl, hydroxymethyl and (lower)alkanoyloxymethyl;

R[8] and R[9], when taken separately, are independently members selected from the group consisting of hydrogen and lower alkyl; and
acid addition salts thereof, with water at a pH of from about 1.5 to about 9.0 at ambient temperature.

6. A compound of the formula:

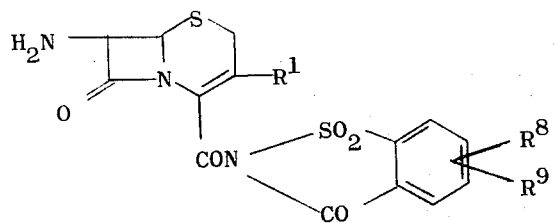

wherein
R¹ is a member selected from the group consisting of methyl, hydroxymethyl and (lower)alkanoyloxymethyl;
R⁸ and R⁹, when taken separately, are independently members selected from the group consisting of hydrogen, lower alkyl, lower alkoxy, halogen, phenyl, phen(lower)alkyl, lower alkoxyphenyl, 2-pyridyl, 4-pyridyl, trihalomethyl, nitro, di(lower)alkylamino, sulfamido, carb(lower)alkoxy, cyano, lower alkylthio, lower alkylsulfonyl and when joined they complete a benzene ring fused to the existing benzene ring to form a naphthalene ring; and acid addition salts thereof.

7. A process for preparing a 2-carboxy amine compound having one of the formulae:

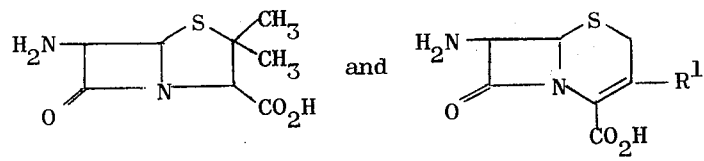

which comprises contacting a 2-amido amine compound having one of the formulae:

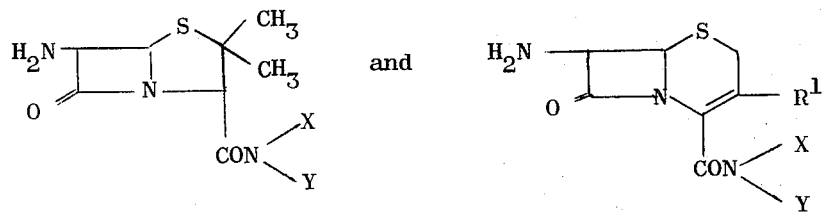

in which
R¹ is selected from the group consisting of methyl, hydroxymethyl and (lower)alkanoyloxymethyl;

X and Y, taken separately are cyano, nitro, trifluoromethylsulfonyl, 2,4,6-trimethylbenzoyl, 2,3,5,6-tetramethylbenzoyl, carb(lower)alkoxy, di(lower)alkylcarbamyl, lower alkylsulfonyl, di(lower)alkylsulfamyl, di(lower)alkylamino(lower)alkylsulfonyl, lower alkanoyl, cyclo(lower)alkanoyl, naphthoyl, furoyl, naphthyl sulfonyl, pyridylsulfonyl, furylsulfonyl,

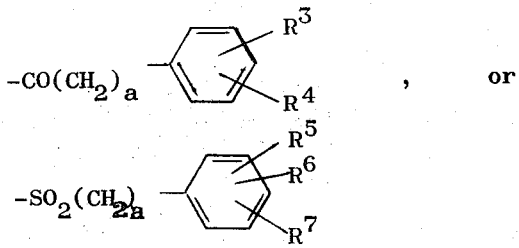

wherein R³ and R⁴ are hydrogen, lower alkyl, halogen, trifluoromethyl, lower alkoxy, phenyl, phenoxy, nitro, lower alkylsulfonyl, or di(lower)alkylsulfamyl; R⁵, R⁶ and R⁷ are hydrogen, nitro, halogen, trifluoromethyl, lower alkoxy, lower alkylsulfonyl, lower alkylthio, di(lower)alkylsulfamyl, di(lower)alkylcarbamyl, cyano or carb(lower)alkoxy; and the integer $a$ is from 0 to 6;

and
X and Y, when taken together with the nitrogen atom to which they are attached are selected from the group consisting of:

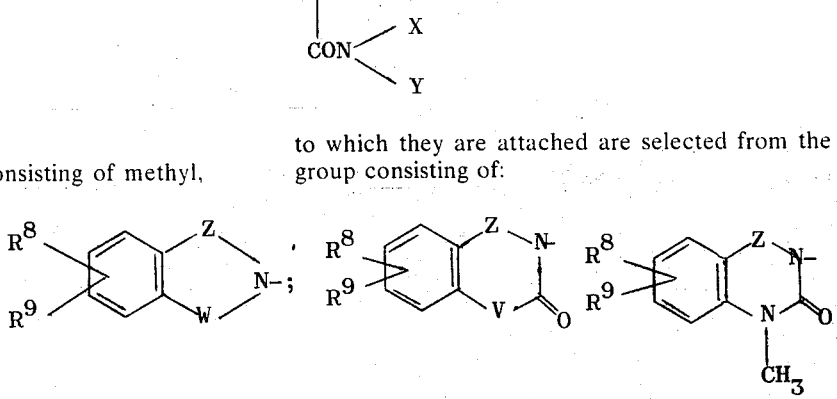

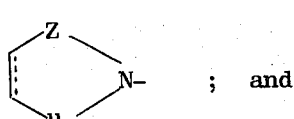 ; and 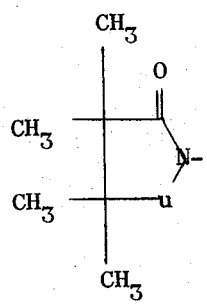

wherein R⁸ and R⁹ when taken separately are hydrogen;

lower alkyl; lower alkoxy; halogen; phenyl; phen(-lower)-alkyl; lower alkoxyphenyl; 2-pyridyl; 4-pyridyl; trihalomethyl; nitro; di(lower)alkylamino; sulfamido, carb(lower)alkoxy, cyano, lower alkylthio, or lower alkylsulfonyl, and when $R^8$ and $R^9$ are joined, they complete a benzene ring fused to the existing benzene ring to form therewith a naphthalene ring; Z is selected from the group consisting of sulfonyl and carbonyl; W is selected from the group consisting of sulfonyl, carbonyl and methylene; V is selected from the group consisting of oxygen, sulfur and methylene; $u$ is selected from the group consisting of carbonyl and methylene; and the broken line indicates the presence of a single or double bond between these two positions, with water at a pH of from about 1.5 to about 9.0 at ambient temperature.

8. A process which comprises
a. contacting a phosphorus pentahalide in the presence of an acid acceptor and an inert organic solvent with a compound selected from the formulae:

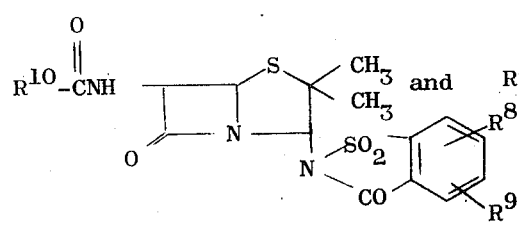

b. reacting the haloimidoyl product with a lower alkanol to produce a lower alkoxyimido hydrohalide; and
c. hydrolyzing said lower alkoxyimido hydrohalide essentially by contact with water to yield a product selected from those of the formulae:

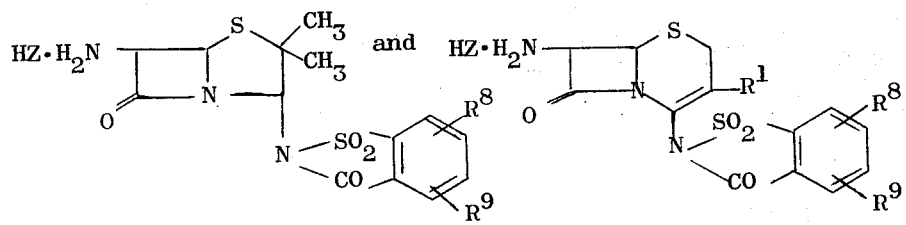

Z represents the halide employed as phosphorus pentahalide;
$R^1$ is selected from the group consisting of methyl, hydroxymethyl and (lower)alkanoyloxymethyl;

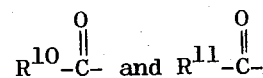

represent acyl moieties present in natural and synthetic penicillin and cephalosporin derivatives;
$R^8$ and $R^9$, when taken separately, are independently members selected from the group consisting of hydrogen, lower alkyl, lower alkoxy, halogen, phenyl, phen(lower)alkyl, lower alkoxyphenyl, 2-pyridyl, 4-pyridyl, trihalomethyl, nitro, di(lower)alkylamino, sulfamido, carb(lower)alkoxy, cyano, lower alkylthio, lower alkylsulfonyl and when joined they complete a benzene ring fused to the existing benzene ring to form a naphthalene ring;

and
acid addition salts thereof.

9. A process for preparing a 2-carboxy amine compound having one of the formulae:

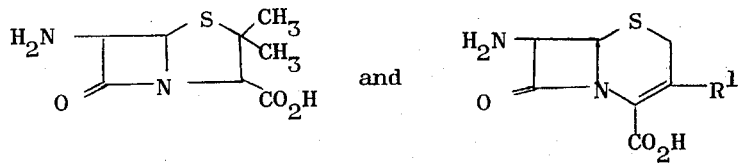

which comprises contacting a 2-amido amine compound having one of the formulae:

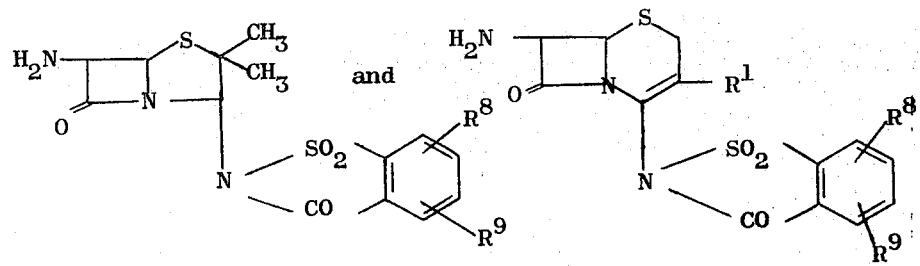

R¹ is selected from the group consisting of methyl, hydroxymethyl and (lower)alkanoyloxymethyl;

R⁸ and R⁹, when taken separately, are independently members selected from the group consisting of hydrogen, lower alkyl, lower alkoxy, halogen, phenyl, phen(lower)alkyl, lower alkoxyphenyl, 2-pyridyl, 4-pyridyl, trihalomethyl, nitro, di(lower)alkylamino, sulfamido, carb(lower)alkoxy, cyano, lower alkylthio, lower alkylsulfonyl and when joined they complete a benzene ring fused to the existing benzene ring to form a naphthalene ring; and acid addition salts thereof, with water at a pH of from about 1.5 to about 9.0 at ambient temperature.

10. A process which comprises
   a. contacting a phosphorus pentahalide in the presence of an acid acceptor and an inert organic solvent with a compound selected from the formulae:

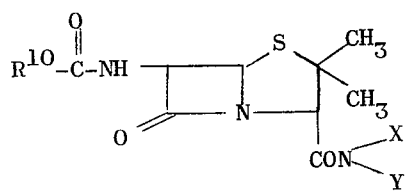 and 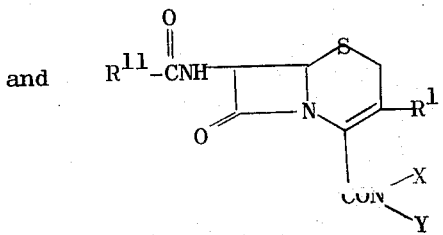

b. reacting the haloimidoyl product with a lower alkanol to produce a lower alkoxyimido hydrohalide; and
   hydrolyzing said lower alkoxyimido hydrohalide essentially by contact with water to yield a product selected from those of the formulae:

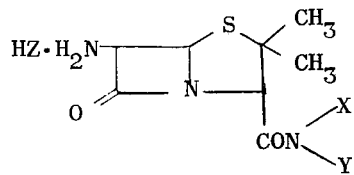 and 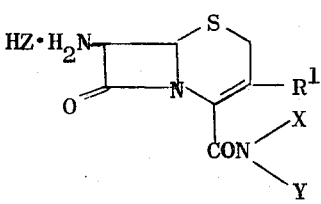

Z represents the halide employed as phosphorus pentahalide;

R¹ is selected from the group consisting of methyl, hydroxymethyl and (lower) alkanoyloxymethyl;

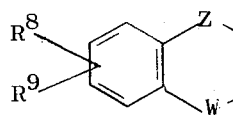 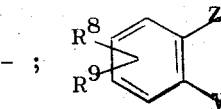 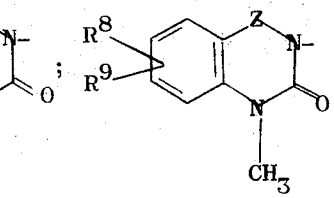

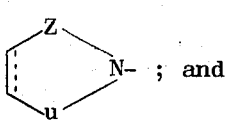 and 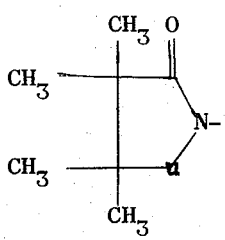

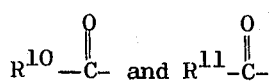

represent acyl moieties present in natural and synthetic penicillin and cephalosporin derivatives; and X and Y when taken separately are cyano, nitro, trifluoromethylsulfonyl, 2,4,6-trimethylbenzoyl, 2,3,5,6-tetramethylbenzoyl, carb(lower)alkoxy, di(lower)alkylcarbamyl, lower alkylsulfonyl, di(lower)alkylsulfamyl, di(lower)alkylamino(lower)-alkylsulfonyl, lower alkanoyl, cyclo(lower)alkanoyl, naphthoyl, furoyl, naphthyl sulfonyl, pyridylsulfonyl, furylsulfonyl,

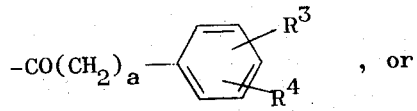, or

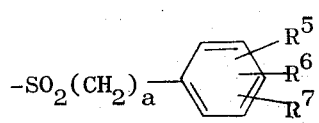

wherein R³ and R⁴ are hydrogen, lower alkyl, halogen, trifluoromethyl, lower alkoxy, phenyl, phenoxy, nitro, lower alkylsulfonyl, or di(lower)alkylsulfamyl; R⁵, R⁶ and R⁷ are hydrogen, nitro, halogen, trifluoromethyl, lower alkoxy, lower alkylsulfonyl, lower alkylthio, di(lower)alkylsulfamyl, di(lower)alkylcarbamyl, cyano or carb(lower) alkoxy; and a is an integer from 0 to 6, and X and Y, when taken together, with the nitrogen atom to which they are attached are selected from the group consisting of:

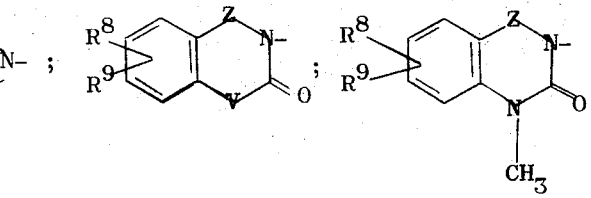

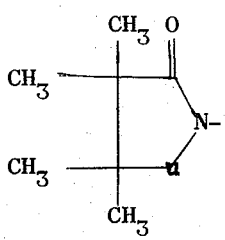 and wherein R⁸ and R⁹ when taken separately can be hydrogen; lower alkyl; lower alkoxy; halogen; phenyl; phen(-lower)-alkyl; lower alkoxyphenyl; 2-pyridyl; 4-pyridyl; trihalomethyl; nitro; di(lower)alkylamino; sulfamido; carb-(lower)alkoxy, cyano, lower alkylthio, lower alkylsulfonyl, and when R⁸ and R⁹ are joined, they complete a benzene ring fused to the existing benzene ring to form therewith a naphthalene ring; Z is selected from the group consisting of sulfonyl and carbonyl; W is selected from the group consisting of sulfonyl, carbonyl and methylene; V is selected from the group consisting of oxygen, sulfur and methylene; $u$ is selected from the group consisting of carbonyl and methylene; and the broken line indicates the presence of a single or double bond between these two positions.

* * * * *